United States Patent [19]

Scholten et al.

[11] 4,097,875
[45] Jun. 27, 1978

[54] SHAFT ENCODER

[75] Inventors: Frank L. Scholten, Katonah, N.Y.; Francis S. Szabo, Mountain Lakes, N.J.

[73] Assignee: Addressograph-Multigraph Corporation, Cleveland, Ohio

[21] Appl. No.: 784,553

[22] Filed: Apr. 4, 1977

[51] Int. Cl.² ............................ G03B 15/24; G01D 5/34
[52] U.S. Cl. ................................................ 354/8; 354/15; 250/231 SE; 250/237 G
[58] Field of Search ............... 354/5, 8, 15; 346/76 L, 346/108; 250/231 SE, 237 G

[56] References Cited

U.S. PATENT DOCUMENTS 3,912,926  10/1975  Coulbourn ............... 250/231 SE
4,044,363  8/1977   Morgan ..................... 354/8 X

*Primary Examiner*—L. T. Hix
*Assistant Examiner*—M. L. Gellner
*Attorney, Agent, or Firm*—Ray S. Pyle

[57] ABSTRACT

A shaft encoder of negligible moment of inertia. A grating provides a grid pattern of transmitted light. A mirror on the shaft sweeps the pattern. A lens focuses the sweep over a mask of like grid pattern. A photocell is activated by light transmitted through the mask whenever there is a register of the grating image with the mask. By using a mask of N grid lines per unit of measure, and a mask of N plus 1, two cells will be able to detect direction of shaft rotation.

3 Claims, 7 Drawing Figures

SHAFT ENCODER

DEFINITION

Shaft encoders are electromechanical devices which provide the most efficient method of digitizing the variable properties of a rotating shaft. By proper coupling of the input shaft of the encoder when operated in conjunction with suitable electronics, the output from the encoder can be made to represent angular or linear position, speed of rotation, direction of rotation, and amount of rotation.

Absolute encoders, which are sometimes referred to as whole-word encoders, provide digital signals indicative of the variable properties of a rotating shaft in the form of a unique binary word for each discrete shaft position definable within the resolution limitation of any given device. The most common implementation of such an absolute shaft encoder is a disc divided into a discrete number of sections, each of a given number of degrees of the disc, and that section is divided radially between transparent and opaque portions to enable a number of code formats, with the most popular being natural binary, grey code, and eight-four-two-one binary coded decimal.

This invention is concerned with incremental encoders, and principally to bidirectional incremental encoders. These encoders provide digital signals indicative of the variable properties of a rotating shaft in the form of a series of identical pulses for successive increments of input shaft position. By counting these pulses the magnitude of shaft angle displacement from some reference points may be determined. By comparing the pulse rate to a clock, the speed of rotation is obtained.

The digitizing function provided by the bidirectional incremental encoder is essentially the same as provided by the unidirectional type, except that two channels of pulses aligned at 90 electrical degrees are provided. The phase relationship of these quadrature signals, depends upon the shaft rotation and therefore the lead-lag relationship may be utilized to logically determine the direction of shaft rotation.

Shaft encoders are generally massive devices in comparison with the desired mass of the mirror employed in high-speed phototypesetting machines. A phototypesetter employing mirror escapement uses a very small mirror mounted on a shaft operated by a stepper motor. The speed of oscillation of such a mirror may be expected to produce at least 120 newspaper column lines per minute and the trend is for much higher speed. Hence, the mirror is required to scan a line and return to starting position, oscillating at a very high frequency. Any shaft encoder having a mass greater than the mirror, or even as much as the mirror, will cause a slowdown of the oscillating capacity of the escapement device, and hence is objectionable.

Furthermore, the resolution of known shaft position detection devices is coarse in comparison to the very small increment differentiating the space of escapement between an average size alphabet letter and the largest or smallest size. Because of the desire to have a very fine resolution available, magnetic encoding and detection is generally also too coarse.

SUMMARY OF THE INVENTION

It is the principal object of this invention to enable the encoding of a very lightweight, rapidly oscillating shaft with substantially no inertial drag on the shaft by the encoder.

A related object of the invention is to enable the production of resolution in a shaft encoder to the limits of any available stepper motor capable of driving the shaft.

DESCRIPTION OF THE PREFERRED EMBODIMENT

Figure 1:
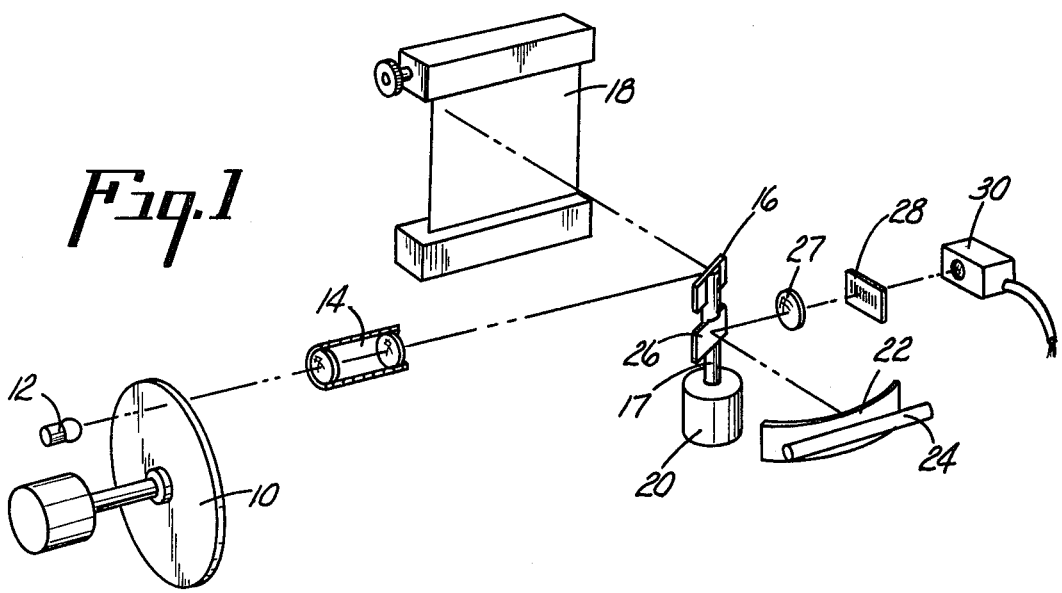
FIG. 1 is a schematic perspective of the essential portions of a photocomposition machine employing an oscillating escapement mirror and shaft encoder according to this invention.

FIGS. 1 and 2 of the drawings will serve as a basis for explaining the basic principle involved in this invention, and the balance of the figures will illustrate the actual adaptation to a commercial photocomposition machine.

The FIG. 1 is diagrammatic but is well within the understanding of those skilled in the art of photocomposition. A font source 10, is a well-known disc font which generally employs more than one font in a circular path and therefore various fonts may be selected by known principles of row-shift equipment.

The symbolic member 12 indicates a flash source which is generally a high peak xeon tube device.

Some photocomposition machines employ multiple lenses on a turret, and others employ a zoom lens principle. A lens system is indicated by the reference character 14.

Photocomposition requires escapement mechanism to space the letters along a line, and all commercial devices available employ a variable escapement in order to space the letters according to an assigned width value. The width value is assigned by typographers who determine the esthetic qualities of the typeface in order that it looks pleasing when properly spaced. Typewriters normally space uniformly and uniform spacing is generally accepted for such business purposes, but well developed typeset printing requires the more sophisticated assignment of width values. Therefore, the escapement cannot be permitted to move a uniform distance after each exposure to set down the next character, but rather the controller for the phototypesetter will cause the positioning of the subsequent character according to its width value and the relationship to the width value of the character preceding.

Some photocomposition machines employ lens devices for escapement which are stepped along by a carriage to project the letters onto a photosensitive surface. Still others employ a carriage which steps a mirror and a decollimator lens in a system which employs a collimator and decollimator lens. The third system, and the one to which this invention relates, is a beam deflecting means, which is an oscillating mirror 16 as shown in FIG. 1 in the preferred embodiment. Normally, because the mirror is at the center point of a circle, if a flat projection surface is used, the projection at the beginning and ending of a line will produce a longer path than projection to the middle of the page. Some compensation is required. Curved paper supports have been employed in order that all portions of the paper are positioned equidistant from the lens at all times. Still other systems have suggested a controller program which changes zoom lens position in accordance with the relationship of the projected character along a paper surface.

The invention is not in the environment of the paper and therefore a photosensitive paper 18 with its supply and takeup housing is illustrated in a flat plane for simplicity of illustration.

The mirror 16 is moved in a variable escapement pattern by means of a stepper motor 20 capable of positioning in very fine increments in order that the mirror may be moved sufficiently to differentiate between the width values of the various characters projected.

This invention is directed to the problem of determining the position of the mirror and providing information to a controller to determine the number of steps that the stepper motor 20 must take in order to position the mirror for the projection of a character. There is no controller illustrated in the drawing, nor will a description of a controller be given in connection with this invention, this technology being now well within the skill of electronic engineers concerned with photocomposition. For example, U.S. Pat. No. 3,968,501 will explain controller mechanism of the type that may be employed with this invention.

A grating 22, designated a projection grating, is a transparency wherein alternate energy transparent and opaque portions enable radiant energy to be projected through the energy transparent portions and focused by a lens to an image plane. The preferred grating is made by photographic processes and consists of an opaque film with several hundred vertical transparent areas preferably in a range of 250–400 evenly spaced areas per inch. A light source 24 behind the grating 22 will project through the transparent portions of the grating.

A second mirror 26, which also is the selected beam deflecting means and is quite suitable for this purpose, is mounted on the shaft 17 although it is equally feasible to mount the mirror 26 on other means carried in oscillation synchronism with the first beam deflecting mirror 16.

As the beam deflector mirror 26 oscillates in synchronism with the mirror 16, the mirror will sweep an image of the grating 22 and project the image through a focusing lens 27. A second grating 28, which is more suitably designated as a mask, is positioned at the focal length of the lens 27 in order that the projected image of the grating 22 may come to a focus upon the surface of the mask 28. A photocell 30 behind the mask 28 is positioned to receive light transmitted by the mask 28 and output a signal when activated by the transmitted light.

Figure 2A:
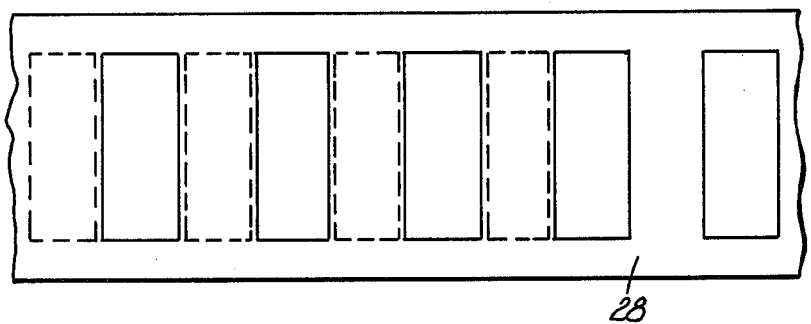
FIGS. 2a, b, and c, illustrate the progression of a projected grating image upon a mask, from a nontransmitting through a fully transmitting registration.
Figure 2B:
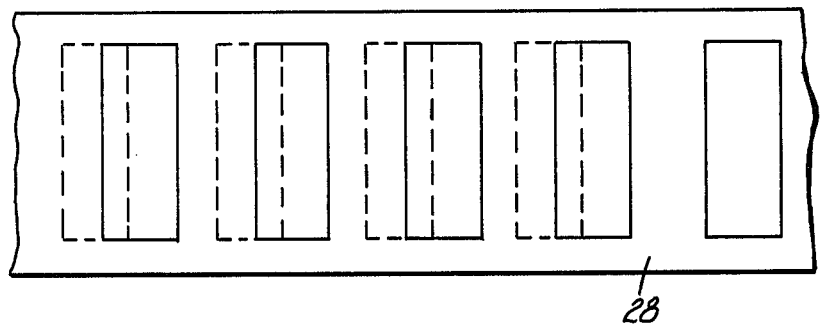
Figure 2C:
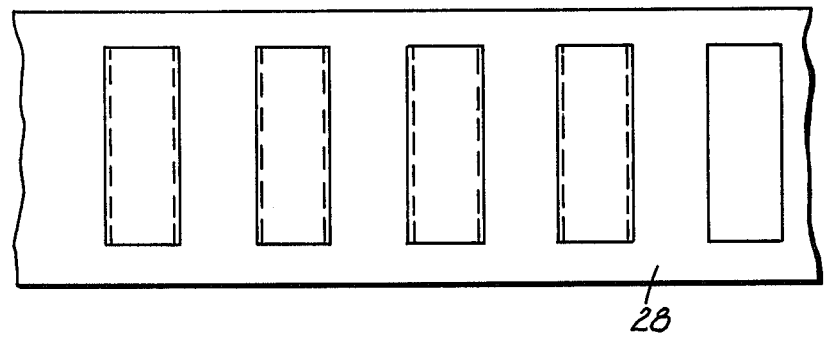

The FIGS. 2a through 2c illustrates what takes place as the mirror 26 sweeps the image of grating 22 across mask 28. In FIG. 2a assume the dotted outline rectangular portions to be images of the light transmitting portions of the grating 22 focused upon the surface of the mask 28 but out of register with the transparent portions of the mask. Hence, light does not reach the photocell 30 and no signal will be outputted from the signal.

Then, as movement of the mirror 26 continues, the image of the light transmitting areas begins to move over the openings in the mask 28 as shown in FIG. 2b, and eventually complete registration is achieved. When registration is achieved as in 2c, sufficient light from a plurality of the transmitting light areas will affect the photocell 30 and cause the cell to produce a signal. That signal can then be utilized by a controller program to indicate that the mirror 16 has reached a known angular relationship between the lens 14 and the paper 18. Therefore determination can be made as to whether it is in proper position for the projection of a character. Thus, a counting register from a starting position may be employed to accurately determine the position of the mirror.

The actual reduction to practice of this invention has shown that the use of a mirror 26 as a beam deflecting means may be carried directly upon the shaft 17 along with the escapement mirror 16 with essentially no deleterious effect upon the speed of escapement which would otherwise be available without the additional burden of the mirror 26. The moment of inertia is so small in relationship to the stepper motor 20 and the mirror 16, that the slowing due to the extra burden is of no consequence. Therefore, this invention provides a unique combination of projected and receptor gratings to measure the position of the escapement mirror, but in addition provides yet another very desirable result.

Known shaft encoders employing the usual timing tracks, not too dissimilar to the timing track employed on a disc such as the font source 10, can provide a resolution of steps that can control the stepper motor 28 only to a reasonable degree of fineness. This invention enables almost limitless resolution by the simple expedient of establishing greater distances of the grating members from one another and a lens which can enlarge the image projected on the mask and produce that image in sharp focus. By increasing the number of grating lines and magnifying the projected image, a resolution beyond the capability of any known stepper motor or need for the finest escapement movement can be easily achieved. Such fineness is not available in known shaft encoder structure, and there is no know shaft encoder of essentially negligible inertia effect upon the escapement movement.

With the background of the invention as thus explained, it will be observed that there is no real distinction in the output from the photocell 30 in either the forward or the reverse direction of mirror movement. Although the output can be useful with proper controller programming, the balance of the drawings and the description pertaining thereto illustrate a means whereby the concepts can be utilized to a more sophisticated degree.

Figure 3:
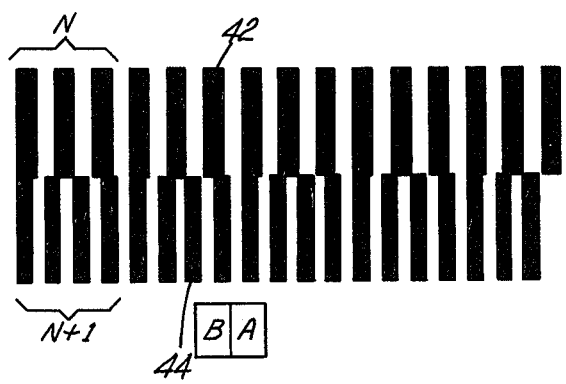
FIG. 3 is a diagram illustrating the use of a greater number of transparent areas in one of the grating members in order to produce a direction of registration positions to determine direction of shaft rotation.
Figure 4:
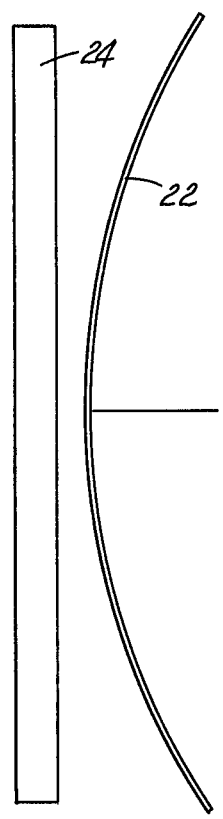
FIG. 4 is a mechanical-electrical schematic showing the use of the nonconforming grating and mask of FIG. 3 to detect direction of rotation.
Figure 4:
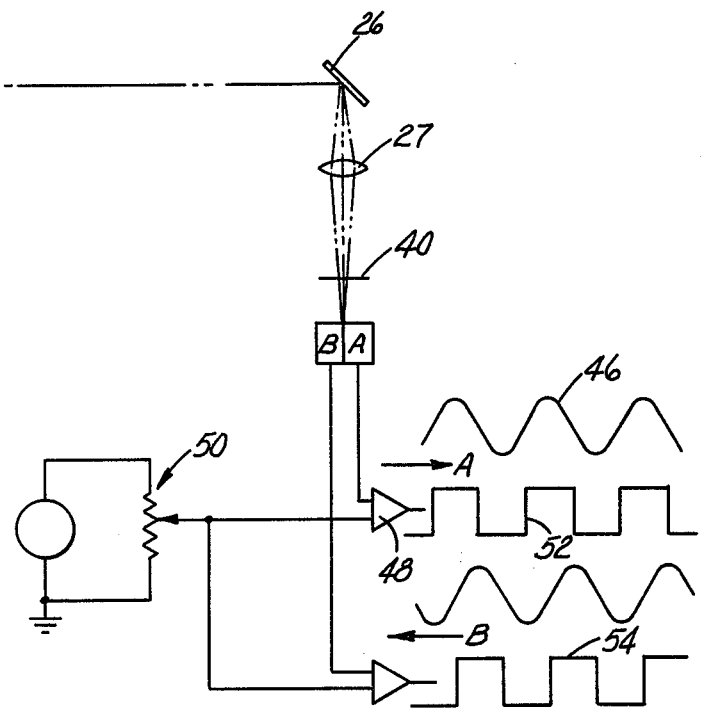

A mask 40, indicated only in the FIG. 4, is shown in this embodiment because it differs slightly from the mask receptor grating 28. This difference is illustrated in FIG. 3. Illustration of an image upon a mask is difficult in drawings, and therefore the FIG. 3 is symbolic but readily understood. The series of rectangular marks 42 indicates a projected image from the projection grating 22. The series 44 are the openings in the mask 40. The projection grating 22 has a number of the energy transparent portions of some number which may be designated N. The receptor grating mask 28 then will have a number N plus some further number X within the given unit of measure. That number X should be a small number in comparison with the number N. For example, the illustration is of N plus 1 for the mask 44.

Those familiar with optical phenomena will recognize that as the image 42 is caused to sweep across the mask 40, registration with the openings 44 will appear to progress across the face of the mask 40 in the direction of rotation of the mirror 26. The number of the concurrent registrations which are visible to the photocell at one time will be determined by the number N per unit of measure.

Two cells A and B shown in FIGS. 3 and 4 are then placed side by side to respond to the visible registration areas. The symbolic circuitry of FIG. 4 will indicate that the output from each cell is a wave form as indicated by the reference character 46 with respect to the output from cell A. A comparator 48, connected to a reference voltage 50 will be selectably settable to turn on when the voltage output from A reaches a desired level and will turn off at that same voltage as the wave form decreases, thus outputting a square wave as shown in the line 52. This signal is easily recognized by known electronic equipment.

The output from cell B is established in identical manner but as the relationship of line 52 to line 54 indicates, the square wave output is 90° out of phase one with the other. In this manner the direction of rotation is determined.

Figure 5:
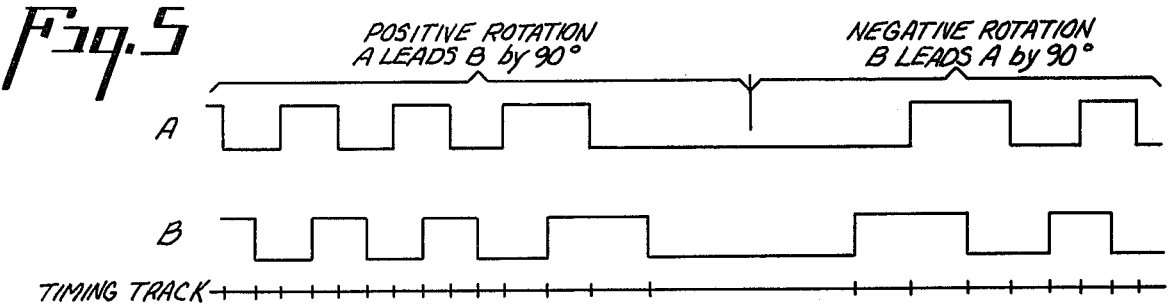
FIG. 5 is an electrical pulse diagram to illustrate the manner of producing a detectable direction output from the sensor means of FIG. 4.

Refer to FIG. 5. FIG. 5 is a time relationship chart, and the spacing is suggestive of the slowing to stop, and reversal. Reading from left to right in FIG. 5 it will be seen that as cell A goes low, it is followed soon thereafter by cell B going low. They both remain low for a period of time when cell A goes high and is followed thereafter by cell B going high. In this way, the controller can recognize that cell A is leading cell B and thereby determine the direction in which shaft 17 is turning. When the shaft reaches the end of its sweep and begins to return, the cell A, which has been leading, stays low and reverses without producing a light registration, until returning to the former position wherein it was high to again go high. In this period of time the cell B does go low but then stays low until it returns again to the position where it last was high.

Reversal can occur at any point within the physical limits of the parts, and the lead-lag relationship will be duplicated.

Hence, a very distinct pattern is recognized by the controller indicating a reversal and hence a known starting point for counting the position steps for the escapement mirror. Therefore, if desired, the composition machine can employ this output to control logic which will permit photosetting from the beginning of a composition line to the end, followed thereafter by a composition from the end to the beginning of the following line and hence double the output speed of the photocomposer.

What is claimed is:

1. In a photocomposition machine wherein characters are projected from a font source to a photosensitive surface, the provision of improved means to space the characters in a line of composition according to the width value of each character, comprising:

a projection system with a focused optical axis;

a first beam deflecting means positioned on said optical axis, for intercepting the focused optical axis and directing it to the photosensitive surface;

means for oscillating said first beam deflecting means through an angle sufficient to project the optical axis in measured steps along a length of composition line;

a projection grating of alternate energy transparent and opaque portions, and means to project radiant energy through the energy transparent portions of the projection grating;

a second beam deflecting means carried in oscillation synchronism with said first beam deflecting means;

a receptor grating of alternate energy transparent and opaque portions, and means including said second beam deflecting means to sweep a projected energy image of said projection grating over said receptor grating along an optical path which includes said second beam deflecting means; and a sensor means sensitive to said radiant energy positioned to detect a registration of the projected energy pattern with the receptor energy transparent portions to provide a position indicating output signal.

2. A photocomposition machine according to claim 1, wherein said beam deflecting means are mirrors, and are carried on a common shaft.

3. In a photocomposition machine wherein characters are projected from a font source to a photosensitive surface, the provision of improved means to space the characters in a line of composition according to the width value of each character, comprising:

a projection system with a focused optical axis;

a first beam deflecting means positioned on said optical axis, for intercepting the focused optical axis and directing it to the photosensitive surface;

means for oscillating said first beam deflecting means through an angle sufficient to project the optical axis in measured steps along a length of composition line;

a projection grating of alternate energy transparent and opaque portions, and means to project radiant energy through the energy transparent portions of the projection grating;

a second beam deflecting means carried in oscillation synchronism with said first beam deflecting means;

a receptor grating of alternate energy transparent and opaque portions, and means including said second beam deflecting means to sweep a projected energy image of said projection grating over said receptor grating along an optical path which includes said second beam deflecting means; and said projection grating having a number of energy transparent portions designated N, and said receptor grating having N plus X wherein X is a number small in comparison to N;

said N and N plus X grating relationship producing the optical effect of a series of illuminate grating portions progressing across the receptor grating in the direction of rotation of said beam deflecting means;

a first and second sensor means sensitive to said radiant energy, positioned laterally aligned to said receptor grating to be activated in sequence by each progressing energy pattern, said grating number and sensor spacing being such that the output response from each sensor means is 90° out of phase with the other, the output thereby indicating direction of beam deflector movement.

* * * * *